United States Patent
Schneider Porepp et al.

(10) Patent No.: US 12,062,948 B2
(45) Date of Patent: Aug. 13, 2024

(54) ROTOR FOR A ROTARY ELECTRIC MACHINE WITH ANGULARLY OFFSET SPACER PLATES

(71) Applicant: WEG EQUIPAMENTOS ELÉTRICOS S.A., Jaraguá do Sul (BR)

(72) Inventors: Guilherme Schneider Porepp, Jaraguá do Sul (BR); Danielle Raphaela Voltolini, Jaraguá do Sul (BR)

(73) Assignee: WEG EQUIPAMENTOS ELÉTRICOS S.A., Jaraguá Do Sul (BR)

(*) Notice: Subject to any disclaimer, the term of this patent is extended or adjusted under 35 U.S.C. 154(b) by 266 days.

(21) Appl. No.: 17/765,316

(22) PCT Filed: Sep. 30, 2019

(86) PCT No.: PCT/BR2019/050423
§ 371 (c)(1),
(2) Date: Mar. 30, 2022

(87) PCT Pub. No.: WO2021/062496
PCT Pub. Date: Apr. 8, 2021

(65) Prior Publication Data
US 2022/0344991 A1 Oct. 27, 2022

(51) Int. Cl.
*H02K 1/32* (2006.01)
(52) U.S. Cl.
CPC ..................... *H02K 1/32* (2013.01)
(58) Field of Classification Search
CPC ............ H02K 1/32; H02K 1/325; H02K 9/02; H02K 9/04; H02K 9/06; H02K 9/08;
(Continued)

(56) References Cited

U.S. PATENT DOCUMENTS

| 925,271 A | * | 6/1909 | Behrend | H02K 1/20 310/65 |
| 3,133,215 A | * | 5/1964 | Petersen | H02K 1/265 310/216.011 |

(Continued)

FOREIGN PATENT DOCUMENTS

| CN | 101136568 | 3/2008 |
| CN | 102570670 | 7/2012 |

(Continued)

OTHER PUBLICATIONS

International Search Report dated Mar. 11, 2020 in International Application No. PCT/BR2019/050423.

(Continued)

*Primary Examiner* — Michael Andrews
(74) *Attorney, Agent, or Firm* — B. Aaron Schulman, Esq.; Stites & Harbison, PLLC

(57) ABSTRACT

A rotor for a rotary electric machine is provided, the rotor including a pack of plates mounted on a shaft, the pack having a plurality of main plates mounted alternately with another plurality of spacer plates and the spacer plates having a base plate with a plurality of spacer profiles, the spacer plate having a crown region close to the shaft and a peripheral region with slots, wherein the plurality of spacer profiles includes at least one guiding spacer profile that has a first end portion arranged radially in relation to the shaft in the crown region of the spacer plate and a second end portion arranged radially in relation to the shaft in the peripheral region of the spacer plate, and the second end portion is offset angularly in relation to the first end portion.

9 Claims, 4 Drawing Sheets

(58) Field of Classification Search
CPC ............ H02K 9/10; H02K 1/26; H02K 1/265; H02K 2201/06
USPC .............................. 310/61, 216.016–216.019
See application file for complete search history.

(56) References Cited

U.S. PATENT DOCUMENTS

| | | | | |
|---|---|---|---|---|
| 3,260,874 | A | * | 7/1966 | Robinson ................. H02K 1/32 310/211 |
| 3,997,803 | A | * | 12/1976 | Mishra ..................... H02K 1/32 310/59 |
| 5,886,435 | A | * | 3/1999 | Dymond ................. H02K 1/20 310/65 |
| 7,898,128 | B2 | | 3/2011 | Hattori et al. |
| 8,049,378 | B2 | | 11/2011 | Hattori et al. |
| 2004/0084976 | A1 | * | 5/2004 | Thiot ....................... H02K 9/12 310/58 |
| 2008/0169710 | A1 | | 7/2008 | Hattori et al. |
| 2010/0176670 | A1 | | 7/2010 | Gottfried |
| 2011/0101801 | A1 | | 5/2011 | Hattori et al. |

FOREIGN PATENT DOCUMENTS

| | | |
|---|---|---|
| EP | 1944853 B1 | 10/2019 |
| WO | WO2010081140 A2 | 7/2010 |

OTHER PUBLICATIONS

Written Opinion dated Mar. 11, 2020 in International Application No. PCT/BR2019/050423.
International Preliminary Report on Patentability dated Apr. 5, 2022 in International Application No. PCT/BR2019/050423.

* cited by examiner

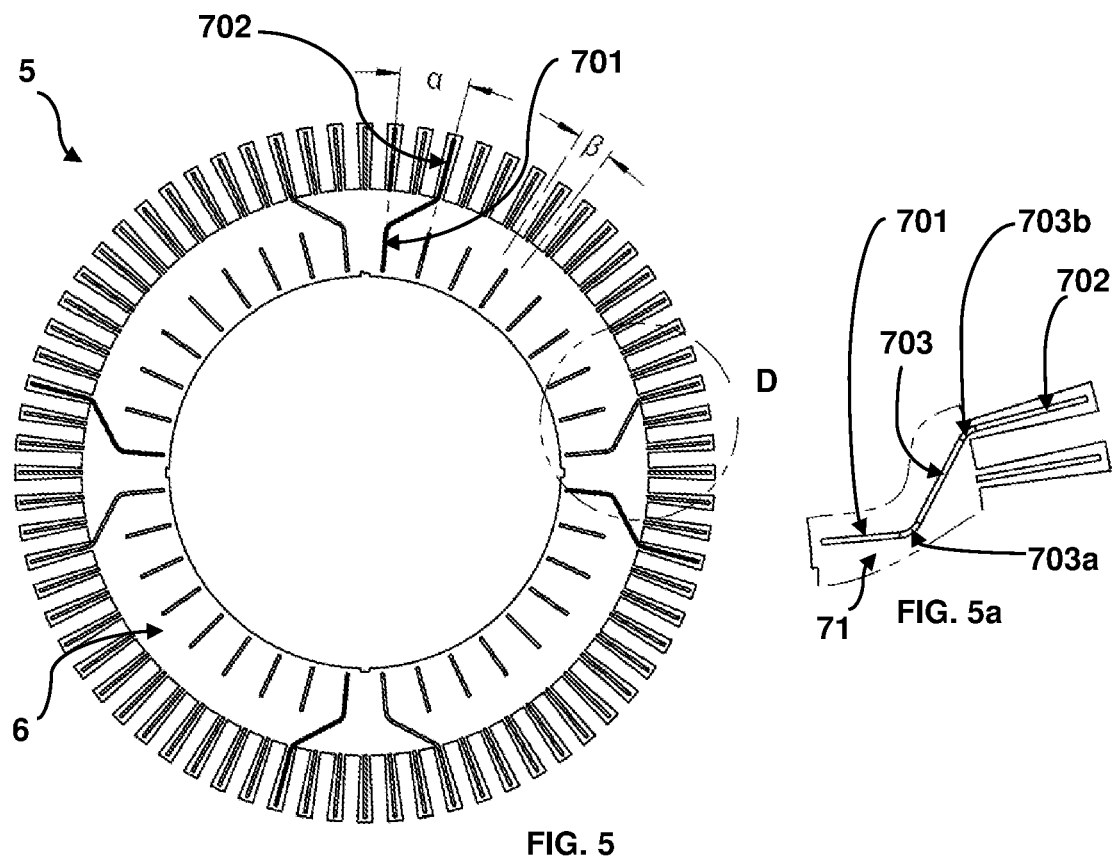
FIG. 5
FIG. 5a
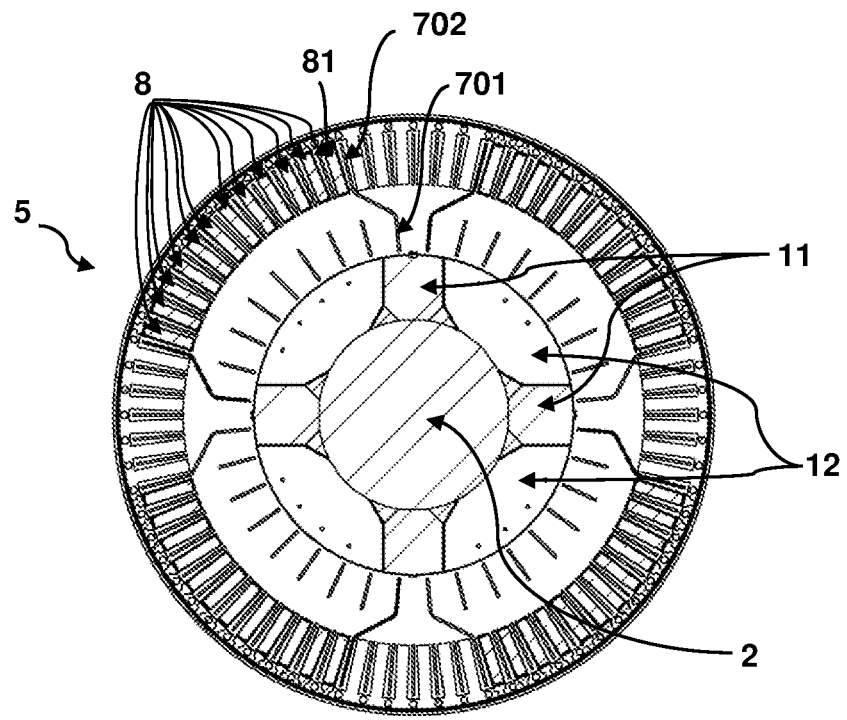
FIG. 6

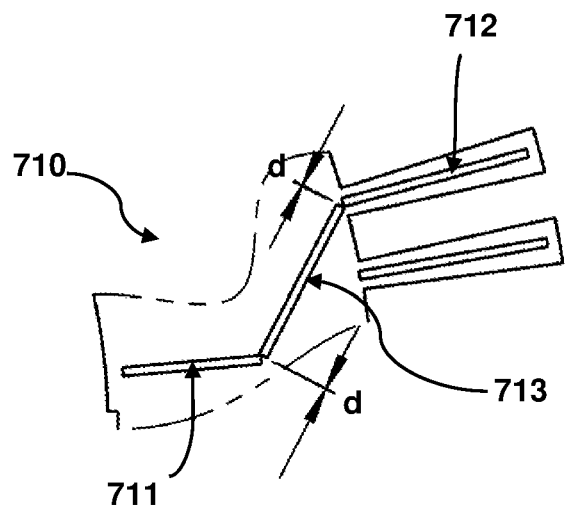
FIG.7
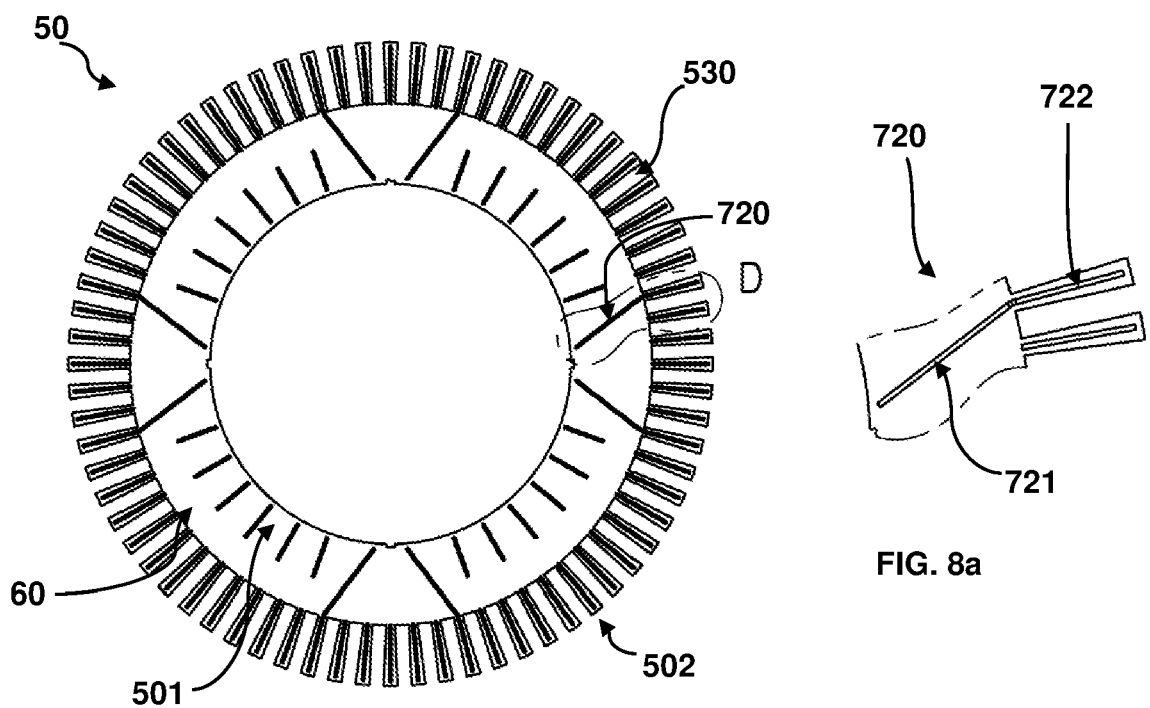
FIG. 8
FIG. 8a

ROTOR FOR A ROTARY ELECTRIC MACHINE WITH ANGULARLY OFFSET SPACER PLATES

FIELD OF THE INVENTION

The present invention relates to the field of rotary electric machines having a ventilation circuit in which the flow of cooling air flows radially through the pack of plates of the rotor towards the stator.

BACKGROUND OF THE INVENTION

Electric machines are equipment used for the transformation of electrical energy into mechanical energy, in the case of motors, and vice versa, in the case of generators. They are constituted by four basic structures, namely: the rotor, which is the rotary energized component, a static element called a stator, also energized, bearings responsible for joining the static and rotary parts, and finally the casing that constitutes not only the role of enclosure of the systems already mentioned, but promotes integration with other auxiliary systems. Auxiliary systems are considered to be those of excitation, cooling, lubrication, among others that can coexist with the main ones, depending on the construction and technical requirements of the equipment.

Both rotors and stators are essentially composed of a ferric core, called pack of plates. This, in its turn, is obtained from the stacking of a certain number of steel plates containing slots or, in a simple way, housings arranged at the end of the plate, which will be filled by conductors, these being wires or bars of a conductive element, such as copper, for example.

In the case of the pack of plates, as already described, these are obtained by the consecutive stacking of plates called main plates up to a length determined in the project. However, in some cases, during the assembly of the pack of plates, some plates, called spacer plates, are interspersed to said main plates.

These spacer plates differ from the main plates because they contain spacer profiles between two adjacent packs of plates. The spacer profiles are projections in the axial direction of the plate, responsible for creating radial pathways through which the air flow coming from the ventilation circuit can pass from the rotor to the stator, or from the stator to the casing. This construction is widely applied to both rotors and stators of rotary electric machines.

Traditionally there are two types of ventilation circuit of rotary electric machines that use the radial channels formed by the spacer plates, named the mixed circuit and the bilateral circuit.

The mixed circuit consists of the inlet of the cooling fluid on one side of the machine and the outlet on the opposite side, and the path traveled by the fluid is partly axial and partly radial. The axial portion consists of the passage of the fluid through axial ducts formed between the pack of plates of the rotor and the shaft, through the space formed between the outer diameter of the rotor and the inner diameter of the stator, known as air gap, and also through the axial ventilation ducts formed between the stator and the casing. The radial portion is performed as already described, by the passage of the cooling fluid through the radial channels of the pack of the rotor and the stator.

The bilateral circuit is similar to the mixed circuit, however in this case the cooling fluid is admitted at both ends of the machine, being driven axially into the machine in its central portion, and then driven radially to the outlet portion of the flow, comprised still in that central portion.

Different arrangements and constructive forms of spacer profiles are known from the state of the art. A possible variation is related to the manufacture of the spacer plates, which can be obtained by welding the spacer profiles directly on a base plate, being possible to apply various processes such as projection welding, spot welding or alternative ways such as the bonding of the spacer profile to the base plate, cutting and subsequent folding of the spacer profile from the base plate, not limited to these processes.

One of the rotor constructive forms applied to rotary electric machines is called cylindrical pole rotor. In this configuration the windings of the conductor are arranged within the slots of the rotor main plate forming what is called a coil.

The windings form coils, which in its turn delimit each of the poles of the electric machine. As schematically illustrated in FIG. 1, the region comprised by the pole is called direct axis, on the other hand the region between adjacent poles is called quadrature axis.

In electric machines with laminated type rotor the most common arrangement for the spacer profiles is in the radial direction equidistantly. In this configuration there is a substantial portion of the air flow of the radial channels flowing in the central region of the direct axis. This is due to the absence of coils in this region, which causes the air passage area to be larger, resulting in less load loss.

Although the flow in the central region of the direct axis contributes to the cooling of the pack of the rotor and the stator, it results in little influence on the cooling of the coil. As a consequence, there is still the generation of additional losses by ventilation as a result of the high air flow in this region, thus reducing the cooling efficiency of the rotor coil.

OBJECTIVES OF THE INVENTION

It is one of the objectives of the present invention to provide a technical solution that solves the problem related to the high flow rate of cooling fluid in the central region of the direct axis of laminated rotors and the consequent high level of mechanical losses generated.

It is one more objective of the present invention to provide a rotor for a rotary electric machine that allows directing the flow of cooling air to the rotor coils.

It is yet another of the objectives of the present invention to provide a rotor for a rotary electric machine that increases the thermal exchange of the coil and reduces the ventilation losses of the machine.

It is one more objective of the present invention to provide a rotor for a rotary electric machine, wherein the spacer profiles of the spacer plate are capable of directing the cooling fluid to the portions containing winding in the rotor.

It is yet another of the objectives of the present invention to provide a rotor for a rotary electric machine, wherein the spacer profiles of the spacer plate enable an increase in air flow in the regions containing the winding to the detriment of the central region of the pole that does not have windings.

BRIEF DESCRIPTION OF THE INVENTION

The present invention achieves the above objectives by means of a rotor comprising a pack of plates mounted on a shaft, wherein said pack of plates is composed of a plurality of main plates mounted in alternation with another plurality of spacer plates, which said spacer plates comprise a base plate with a plurality of spacer profiles.

The spacer plate comprises a crown region close to the shaft and a peripheral region where slots are formed, and at least one spacer profile of the plurality of spacer profiles is a guiding spacer profile comprising:

a first end portion arranged radially in relation to the shaft in the crown region of the spacer plate;

a second end portion arranged radially in relation to the shaft in the peripheral region of the spacer plate;

wherein the second end portion is angularly offset in relation to the first end portion.

In embodiments of the present invention, the second end portion of the at least one guiding spacer profile is arranged in a region formed between two consecutive slots of the peripheral region of the spacer plate.

The plurality of spacer profiles may comprise a first subplurality of straight-shaped spacer profiles arranged radially in relation to the shaft in the crown region of the spacer plate, a second subplurality of straight-shaped spacer profiles arranged radially in relation to the shaft in the peripheral region of the spacer plate, and at least one pair of guiding spacer profiles.

In embodiments of the present invention, the pair of guiding spacer profiles is a symmetric pair arranged in relation to a direct axis of the rotor, and the second end of one of the guiding spacer profiles is arranged in a region adjacent to a first rotor coil drop.

In one embodiment of the present invention, the first and second end portions of the at least one spacer profile are arranged with an angular offset α from each other, the angular offset α corresponding to at least the angular distance β between two consecutive slots of the peripheral region of the spacer plate.

In one embodiment of the invention, the at least one guiding spacer profile further comprises a connecting portion extending between the first end portion and the second end portion.

The first end portion, the second end portion and the connecting portion of the at least one guiding spacer profile can be formed by a single shaped piece. Alternatively, the first end portion, the second end portion and the connection portion of the at least one guiding spacer profile may be formed by adjacent individual profile portions.

In embodiments of the present invention, the first end portion of the at least one guiding spacer profile extends to the second end portion of the at least one guiding spacer profile.

The present invention also relates to a rotary electric machine comprising the rotor of the present invention.

BRIEF DESCRIPTION OF THE DRAWINGS

The present invention will be described in more detail below, with references to the accompanying drawings, in which:

FIG. 3a—is a front view of a rotor according to an embodiment of the present invention;

FIG. 3b—is a side view of a rotor according to an embodiment of the present invention, showing the sectional section AA of FIG. 3a;

FIG. 5—is a front view of a spacer plate of a rotor according to an embodiment of the present invention;

FIG. 5a—is an enlarged view of the detail D shown in FIG. 5;

FIG. 6—is a front view of a spacer plate of a rotor according to an embodiment of the present invention, the spacer plate being shown in conjunction with a main plate of the pack of the rotor;

FIG. 7—is an enlarged view of a guiding spacer profile of a spacer plate of a rotor according to a second embodiment of the present invention;

FIG. 8—is a front view of a spacer plate of a rotor according to a third embodiment of the present invention; and FIG. 8a—is an enlarged view of the detail D shown in FIG. 8.

DETAILED DESCRIPTION OF THE INVENTION

The present invention will be described below based on the preferred embodiments shown in FIGS. 2 to 8.

Figure 1:
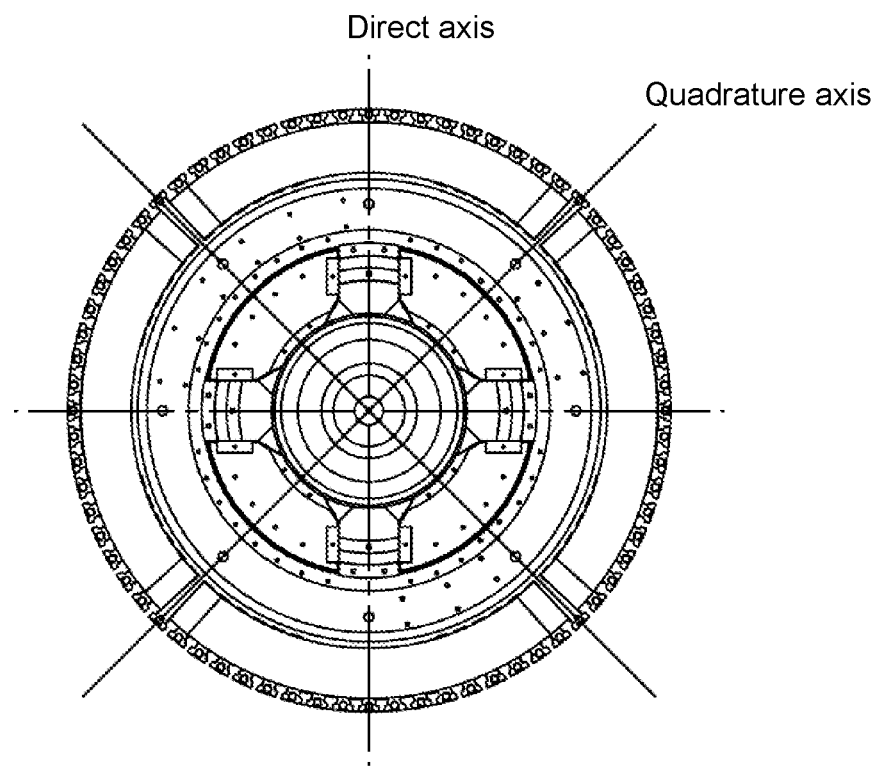
FIG. 1—is a front view of a rotor known from the state of the art.
Figure 2:
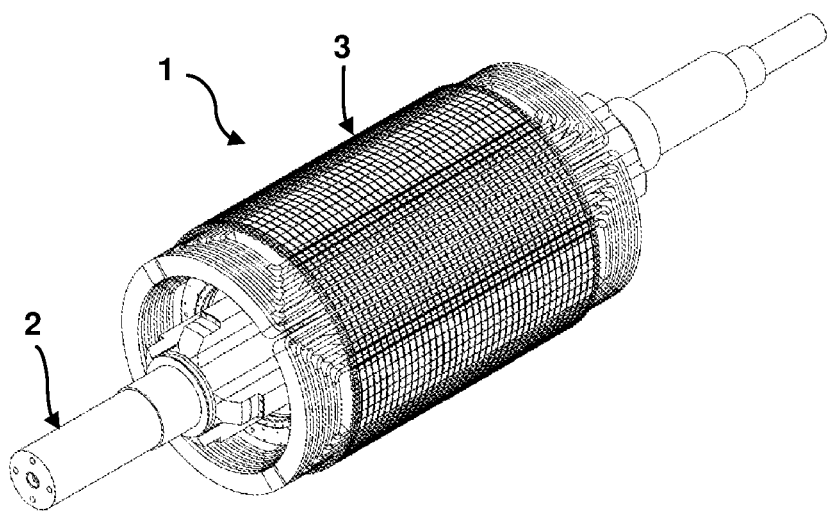
FIG. 2—is a perspective view of a rotor according to an embodiment of the present invention.

FIG. 2 shows a rotor (1) of a rotary electric machine, whether it is a motor or a generator, composed by at least, but not exclusively, a shaft (2) on which a pack of plates (3) is mounted. The construction and function of this type of rotor is known to those skilled in the art, so that only the elements and characteristics necessary for the full understanding of the invention by a person skilled in the art will be detailed in this description.

Figures 3A, 3B:
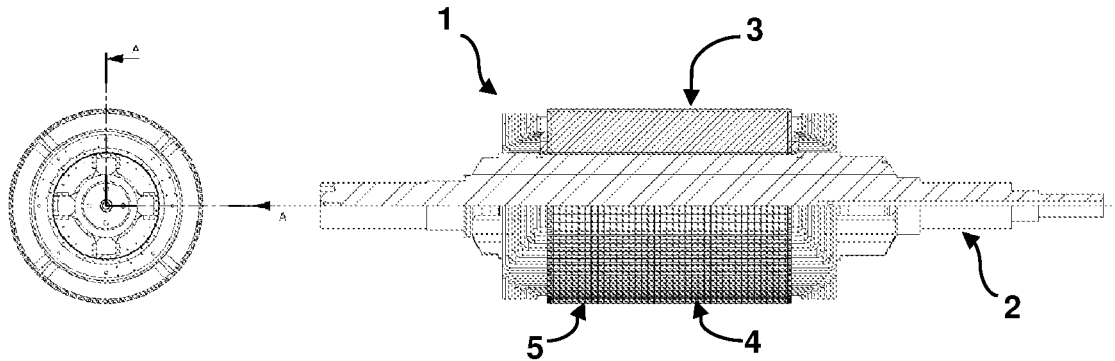

As best illustrated in FIG. 3, the pack of plates (3) comprises a plurality of main plates (4) interspersed at each predetermined length by spacer plates (5). Both the main plates (4) and the spacer plates (5) can be manufactured from carbon steel plates, and may or may not have alloying elements such as for example silicon.

As known by those skilled in the art, each main plate has a peripheral region with slots in which the conductors are inserted and a crown region close to the shaft hole.

Figure 4:
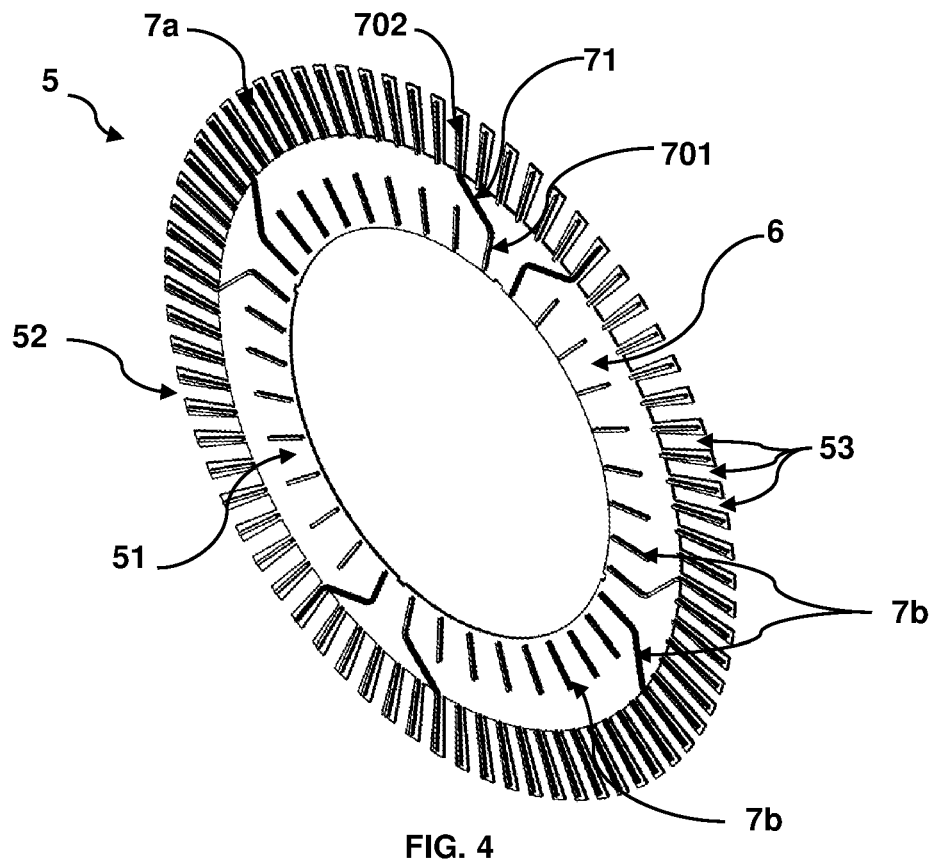
FIG. 4—is a perspective view of a spacer plate of a rotor according to an embodiment of the present invention.

FIGS. 4 to 6 show a first embodiment of the spacer plate (5) according to the present invention.

As can be seen in this figure, the spacer plate (5) comprises a base plate (6) which comprises a plurality of spacer profiles (7). This base plate (6) may have a simplified geometry when compared to the main plate (4), that is, the cutting geometry of the base plate (6) does not need to be identical to the main plate (4).

In the same way as in the main plates, although possibly in a simplified geometry, the spacer plate (5) comprises a crown region (51) close to the shaft and a peripheral region (52) with slots (53).

The spacer profiles (7) may have an arrangement distinct from that presented in the illustrated embodiments of the present invention, and may vary in quantity depending on the variation of the number of slots of the rotor. Furthermore, variation is allowed in both the size and arrangement of the spacer profiles (7) in both the direct axis and the quadrature axis, in the crown (51) and peripheral (52) regions. Thus, variation is also allowed in the arrangement, size and quantity of the spacers (7) and slots (53).

The spacer profiles (7) can be obtained by various means of manufacture, one of which is the use of commercial profiles of type I with wide flaps, which in turn are hot rolled from SAE 1010/1020 carbon steel ingots. However, this configuration is not mandatory to achieve the technical solution of the present invention.

The spacer profiles (7) can be fixed to the base plate (6) by welding (any of its variations including projection welding and spot welding, but not limited to these processes), by bonding or by any other known means.

In the embodiment of the present invention, the plurality of spacer profiles (7) comprises a first subplurality (7a) of straight-shaped spacer profiles (7) arranged radially in relation to the shaft (2) in the crown region (51) of the spacer plate (5); and a second subplurality (7b) of straight-shaped spacer profiles (7) arranged radially in relation to the shaft (2) in the peripheral region (52) of the spacer plate (5).

According to the present invention, the plurality of spacer profiles (7) further includes at least one guiding spacer profile (71) comprising a first end portion (701) with a straight shape arranged in the crown region (51) of the spacer plate (5), and a second end portion (702) with a straight shape arranged in the peripheral region (52) of the spacer plate (5). The second end portion is angularly offset in relation to the first end portion.

As shown in the figures, in preferred embodiments of the present invention, the second end portion (702) of the profile (71) is arranged in a region arranged between consecutive slots (53).

It should be noted that the ends (701) and (702) must be angularly offset from each other. Thus, as best illustrated in FIG. 5, in the first embodiment of the present invention, there is an angular offset (α) between the ends (701) and (702), this offset (α) being equal to at least the angular offset of a slot (β).

The angular offset (α) between the ends (701) and (702) may vary according to the number of slots of the rotor and the number of drops of the main winding (8).

In the embodiment shown in FIGS. 4 to 6, there is a rotor with 6 drops and 72 slots, that is, an angular offset between the slots (β) of 5°.

As best illustrated in FIG. 6, in one embodiment of the present invention, the guiding spacer profile (71) is positioned with its second end (702) adjacent to a first drop region of the coil (81), while its first end (701) must be positioned close to a rib (11) of the rotor shaft (10) or to the corresponding region, in other shaft geometries, the central portion of air inlet in the direct axis of the pole in question, the close term being defined herein in this context as a distance less than the thickness of the rib (11). This allows the flow of ventilation air propelled by the fans (not shown) to the region (12) comprised between the pack of the rotor (10) and the shaft (2) to be directed to the region with coils (8), and not in the central region of the direct axis.

As best seen in the enlarged view of the detail D, shown in FIG. 5a, connecting the first and second ends (701, 701) of the profile (71) there is a straight-shaped connecting portion (703) starting from the first end (701) towards the second end (702).

In the embodiment of the invention shown in FIGS. 4 to 6, the three portions (701, 702 and 703) of the guiding spacer profile (71) compose a single body. Thus, this embodiment can be obtained by conforming the profile to the desired dimensions.

The conformation of the guiding spacer profile (71) forms the existence of fold regions (703a) and (703b). The fold radius shall be such as to permit the fold of the material at the desired angle (a).

Alternatively, in the embodiment shown in FIG. 7, the guiding spacer profile (710) is formed of individual profile portions (711, 712, 713) joined by welding or a similar process. Thus, in this second embodiment of the present invention, there are no profile fold regions. In this configuration, it is necessary that the positioning of the individual profile portions (711, 712, 713) is such that it results in the shortest possible distance d between them.

FIG. 8 shows a third embodiment of the spacer plate according to the present invention, wherein the at least one guiding spacer profile (720) comprises only a first end portion (721) and a second end portion (722).

Thus, in this embodiment, the first end portion (721) extends, in a straight path, from the crown region (501) of the spacer plate (50) to the second end portion (722) arranged in the peripheral region (502) of the spacer plate (50).

Preferably, the first end (721) of the guiding profile (720) should be at about 10 mm from the inner edge of the base plate (60), while the second end (721) of the spacer profile (720) should be at an optimal distance of about 5 mm from the outer edge of the base plate (60). The length of the segment formed by the first extended end (721) must correspond to half the total dimension of the crown of the plate (60), and the length of the second end (722) must have a dimension equivalent to the height of the slot (530).

It is noteworthy that in the other embodiments of the invention, the first end of the guiding profile should preferably be at about 10 mm from the inner edge of the base plate, while the second end of the spacer profile should preferably be at an optimal distance of about 5 mm from the outer edge of the base plate.

In the embodiments of the invention shown in the figures, the first subplurality of spacer profiles (7a) is arranged in such a way that the airflow passage area between the profiles of the first subplurality and the guiding spacer profile (71, 710, 720) is not less than 75%, limited to 100%, of the linear dimension between two spacer profiles of the subplurality (7a).

The guiding spacer profiles (71, 710, 720) must be positioned in symmetric pairs in relation to the direct axis of each rotor pole. Thus, for machines with four poles, 8 guiding spacer profiles (71, 710, 720) mounted in pairs on each of the poles are preferably used.

As examples of preferred embodiments of the present invention have been described, it should be understood that the scope of the present invention encompasses other possible variations of the inventive concept described, being limited only by the content of the claims, including the possible equivalents.

The invention claimed is:

1. A rotor for a rotary electric machine, the rotor comprising a pack of plates mounted on a shaft, wherein said pack of plates comprises a plurality of main plates mounted alternately with another plurality of spacer plates, said spacer plates of which comprise a base plate with a plurality of spacer profiles, the spacer plate comprising a crown region close to the shaft and a peripheral region where slots formed, wherein one spacer profile of the plurality of spacer profiles is a guiding spacer profile comprising:
   a first end portion arranged radially in relation to the shaft in the crown region of the spacer plate;
   a second end portion arranged radially in relation to the shaft in the peripheral region of the spacer plate;
   wherein the second end portion is angularly offset in relation to the first end portion; and
   wherein the first and second end portions of the at least one spacer profile are arranged with an angular offset (α) from each other, the angular offset (α) corresponding to at least the angular distance (β) between two consecutive slots of the peripheral region of the spacer plate.

2. The rotor according to claim 1, wherein the second end portion of the at least one guiding spacer profile is arranged in a region formed between two consecutive slots of the peripheral region of the spacer plate.

3. The rotor according to claim 1, wherein the plurality of spacer profiles comprises:
- a first subplurality of straight-shaped spacer profiles arranged radially in relation to the shaft in the crown region of the spacer plate,
- a second subplurality of straight-shaped spacer profiles arranged radially in relation to the shaft in the peripheral region of the spacer plate, and
- at least one pair of guiding spacer profiles.

4. The rotor according to claim 3, wherein the rotor comprises a pole with a central region having an absence of coils and the pair of guiding spacer profiles is a symmetric pair arranged in relation to a direct axis of the rotor, and wherein the second end of one of the guiding spacer profiles is arranged in a region adjacent to a first coil from the central region of the pole.

5. The rotor according to claim 1 wherein the at least one guiding spacer profile further comprises a connecting portion extending between the first end portion and the second end portion.

6. The rotor according to claim 5, wherein the first end portion the second end portion and the connecting portion of the at least one guiding spacer profile are formed by a single shaped piece.

7. The rotor according to claim 6, wherein the first end portion, the second end portion and the connecting portion of the at least one guiding spacer profile are formed by adjacent individual profile portions.

8. The rotor according to claim 1, wherein the first end portion of the at least one guiding spacer profile extends to the second end portion of the at least one guiding spacer profile.

9. A rotary electric machine comprising the rotor as defined in claim 1.

* * * * *